United States Patent
Aulanko et al.

(10) Patent No.: US 9,212,029 B2
(45) Date of Patent: Dec. 15, 2015

(54) TRACTION SHEAVE ELEVATOR

(75) Inventors: Esko Aulanko, Kerava (FI); Matti Räsänen, Hyvinkää (FI); Sakari Korvenranta, Hyvinkää (FI); Raimo Pelto-Huikko, Vantaa (FI)

(73) Assignee: Kone Corporation, Helsinki (FI)

( * ) Notice: Subject to any disclaimer, the term of this patent is extended or adjusted under 35 U.S.C. 154(b) by 538 days.

(21) Appl. No.: 13/595,527

(22) Filed: Aug. 27, 2012

(65) Prior Publication Data

US 2012/0318615 A1 Dec. 20, 2012

Related U.S. Application Data

(63) Continuation of application No. PCT/FI2010/050788, filed on Oct. 8, 2010.

(30) Foreign Application Priority Data

Mar. 11, 2010 (FI) ........................................ 20105238

(51) Int. Cl.
*B66B 15/04* (2006.01)
*F16H 55/38* (2006.01)
(Continued)

(52) U.S. Cl.
CPC .............. *B66B 15/04* (2013.01); *B66B 19/007* (2013.01); *F16H 55/38* (2013.01); *B66B 11/008* (2013.01);
(Continued)

(58) Field of Classification Search
CPC ...... B66B 11/04; B66B 11/008; B66B 11/08; B66B 19/007; B66B 15/04; B66D 1/30; B66D 3/04; F16H 55/38; F16H 55/50; Y10T 29/49718

USPC .......................... 187/254, 266; 254/271, 333
See application file for complete search history.

(56) References Cited

U.S. PATENT DOCUMENTS 1,944,426 A 1/1934 Greening
3,776,059 A * 12/1973 Habermann .................. 474/177
(Continued)

FOREIGN PATENT DOCUMENTS

CN 1294271 A 5/2001
CN 1476408 A 2/2004
(Continued)

OTHER PUBLICATIONS

Chinese Office Action dated Jun. 4, 2014 issued in corresponding Chinese Application No. 201080066728.4 (with English translation).
(Continued)

*Primary Examiner* — Emmanuel M Marcelo
*Assistant Examiner* — Stefan Kruer
(74) *Attorney, Agent, or Firm* — Harness, Dickey & Pierce, P.L.C.

(57) ABSTRACT

The object of the invention is a method for modernizing an elevator, and a traction sheave elevator, which elevator comprises at least an elevator car and a traction sheave that moves the elevator car by means of elevator ropes, the rim of which traction sheave comprises one or more rope grooves. In connection with modernization a traction sheave is installed as the traction sheave of the elevator, the rope grooves of which traction sheave comprise a material, the frictive traction achieved by which is greater than the frictive traction between the parent material of the metallic traction sheave and the elevator ropes.

15 Claims, 6 Drawing Sheets

(51) Int. Cl.
  *B66B 19/00* (2006.01)
  *B66B 11/00* (2006.01)
  *B66D 1/30* (2006.01)
  *B66D 3/04* (2006.01)

(52) U.S. Cl.
  CPC ... *B66D 1/30* (2013.01); *B66D 3/04* (2013.01); *B66D 2700/026* (2013.01); *Y10T 29/49718* (2015.01)

(56) References Cited

U.S. PATENT DOCUMENTS

| | | | | |
|---|---|---|---|---|
| 3,934,482 | A | * | 1/1976 | Byers ............................ 474/9 |
| 4,402,488 | A | * | 9/1983 | Berkovitz .................... 254/371 |
| 4,501,115 | A | | 2/1985 | Suzuki et al. |
| 4,591,025 | A | | 5/1986 | Honda |
| 5,399,141 | A | * | 3/1995 | Takahashi ..................... 492/47 |
| 6,635,000 | B2 | * | 10/2003 | Meindl .......................... 492/39 |
| 2003/0138621 | A1 | * | 7/2003 | Bollmann et al. ......... 428/318.6 |
| 2003/0183458 | A1 | * | 10/2003 | Mustalahti et al. .......... 187/254 |
| 2005/0126859 | A1 | * | 6/2005 | Aulanko et al. .............. 187/264 |

FOREIGN PATENT DOCUMENTS

| | | | | |
|---|---|---|---|---|
| CN | 1756711 | A | | 4/2006 |
| DE | 2203359 | C2 | * | 2/1982 .............. F16H 55/50 |
| EP | 185531 | A1 | * | 6/1986 .............. F16H 55/50 |
| FR | 2820483 | A1 | * | 8/2002 .............. F16H 55/50 |
| GB | 1121220 | A | | 7/1968 |
| GB | 2118195 | A | | 10/1983 |
| JP | 54124136 | A | | 9/1979 |
| JP | 10029777 | A | | 2/1998 |
| JP | 2003104667 | A | | 4/2003 |
| JP | 2009191342 | A | | 8/2009 |

OTHER PUBLICATIONS

International Search Report PCT/ISA/210 for International Application No. PCT/FI2010/050788 dated Jan. 28, 2011.

Written Opinion of the International Searching Authority PCT/ISA/237 for International Application No. PCT/FI2010/050788 dated Jan. 28, 2011.

* cited by examiner

TRACTION SHEAVE ELEVATOR

CROSS REFERENCE TO RELATED APPLICATIONS

This is a continuation of PCT/FI2010/050788 filed Oct. 8, 2010, which is an International Application claiming priority to FI 20105238 filed on Mar. 11, 2010, the entire contents of which are hereby incorporated by reference.

BACKGROUND

The modernization of elevators in prior art generally focuses on elevators that no longer technically and/or otherwise meet the requirements of the time. Modernization might focus on some subfunctions or subsystems, or at its most extreme might mean the complete renewal or essentially complete renewal of elevators. Points to be possibly modernized include, inter alia: the control system of the elevator; the hoisting function, with machinery and roping, of the elevator; the doors of the elevator; and the elevator car. Maintenance procedures of elevators, on the other hand, maintain the existing systems and functionality of an elevator. Thus it is normal that when the hoisting ropes have worn out, they are replaced with new ones and, generally in this case, with similar ones. At the same time the traction sheave can be renewed or overhauled. Thus, for example, also the replacement ropes will last for essentially the same time as the old ropes had lasted. Correspondingly, when renewing a traction sheave, the new traction sheave corresponds in its properties to the previous traction sheave. Maintenance activities do not, nor generally do modernizations either, result in substantial changes to the roping arrangement.

When addressing the lifetime of hoisting ropes, it is good to know that in traction sheave elevators the rope tension of an elevator rope passing over the traction sheave on different sides of the traction sheave is usually of a different magnitude, which endeavors inter alia to cause slipping of the hoisting rope in the rope groove of the traction sheave. The tension differences result from the counterweight on the one side of the traction sheave not being of the same weight as the elevator car with load on the opposite side of the traction sheave. Sometimes the elevator car is empty, sometimes full and sometimes between these. On the other hand, the mass of the counterweight does not generally change. The aim is to select the mass of the counterweight to be as optimal as possible bearing in mind different loads of the elevator car, but this is not necessarily sufficient in all situations. These types of situations can be e.g. accelerations, brakings and emergency stops. Up to a certain limit the slipping of ropes on a traction sheave resulting from a tension difference is easy to control, but often the friction of metallic rope grooves is not sufficient for managing sudden large tension differences, in which case the elevator ropes start to slip too much in the rope grooves of the traction sheave.

According to prior art, the aim has been to improve the friction needed in the rope grooves of the traction sheave by, among other things, making an undercut that is wider than usual in the rope grooves. This solution does indeed increase the friction but at the same time the stressing of the elevator rope increases, because the support surface of the elevator rope in the rope groove decreases. In practice this solution is not for this reason advantageous, because the lifetime of ropes decreases as the stressing of the ropes increases.

One way of improving friction is presented in the solution according to Japanese patent publication no. JP54124136 (A). In it, a material that improves friction, such as asbestos, is disposed in the undercut of the rope grooves, which material presses from below against the elevator rope, pushed by a separate flexible material that is lower in the same undercut. As the asbestos wears, the flexible material pushes the asbestos ring towards the elevator rope. A problem in this solution is inter alia that a two-component material in an undercut groove is difficult to control. The elevator rope endeavors to push the asbestos ring in front of it under the effect of friction, in which case a force acts on the interface between the asbestos and the flexible material, which force might break the structure. In addition, this type of structure is extremely difficult to dimension correctly.

Correspondingly, United States patent publication no. U.S. Pat. No. 1,944,426 presents in FIG. 1 a rope sheave solution, in which the base of a metallic rope groove of a metallic rope sheave comprises a groove which is filled with rubber, which is glued to the groove. The purpose of the rubber here is, however, to save the steel rope from wear by letting the steel rope expand in the direction of the rubber. There is no mention in the publication about the improvement of frictive traction, nor does it become clear from the publication how the rope groove, the height of the rubber and the diameter of the steel rope are mutually dimensioned.

According to prior art, frictive traction is also improved by enlarging the angle of contact between the elevator ropes and the traction sheave. In this case e.g. so-called double-wrap (DW) and extended single-wrap (ESW) structures are used, in which an angle of contact of approx. 270-360 degrees can easily be obtained, and also over 360 degrees can be obtained when the ropes are passed around the traction sheave by more than one rotation. The result is good frictive traction, but one problem in these solutions is rope bendings that stress the ropes, which bendings wear the ropes and thus shorten the lifetime of the ropes.

SUMMARY

Example embodiments relate to elimination of the aforementioned drawbacks and to achieve a manufacturing solution and/or modernization solution of an elevator in which the traction sheave in an existing elevator is replaced in connection with replacement of the ropes, the rope groove of which traction sheave comprises at least two different materials, which are interfitted such that the fictive traction of the rope groove is large, as a consequence of which it has been possible to make the shape of the rope groove to be such that wearing of the elevator ropes decreases and the lifetime of the elevator ropes increases. Example embodiments are also to achieve a solution in which slipping of the elevator ropes is easy to control. Other example embodiments are to achieve a method for manufacturing or modernizing a traction sheave elevator, in which traction sheave elevator owing to good frictive traction and the controllability of slipping and, as a consequence of this, owing to improved rope-traction sheave contact, it has been possible to simplify and lighten the structures of the elevator with respect to earlier. In this exemplary embodiment, e.g. in connection with modernization, the so-called double-wrap (DW) and extended single-wrap (ESW) structures that wear the ropes are removed and replaced with a simpler so-called single-wrap (SW) structure that wears the ropes much less, which SW structure comprises many fewer rope bendings that stress the ropes than in the aforementioned DW and ESW structures. Yet another example embodiment is to achieve a traction sheave elevator, which comprises a traction sheave, the rope groove of which comprises at least two different materials, which are interfitted such that the frictive traction of the rope groove is large, as a consequence of which it has been possible to make the shape of the rope groove to be such that wearing of the elevator ropes decreases and the lifetime of the elevator ropes increases, and in connection with which traction sheave the slipping of the ropes is easy to control.

Example embodiments relate to a traction sheave elevator and a traction sheave with rope grooves comprising at least two different materials. Example embodiments may also consist of several separate embodiments, especially if example embodiments are considered in the light of expressions or implicit sub-tasks or from the point of view of advantages or categories of advantages achieved. In this case, some of the attributes contained in the claims below may be superfluous from the point of view of separate exemplary concepts. Likewise the different details presented in connection with each exemplary embodiment can also be applied in other example embodiments. In addition, it can be stated that at least some of the dependent claims can at least in some situations be deemed to be inventive in their own right.

The rope tension of the elevator ropes on a traction sheave of a traction sheave elevator, which traction sheave usually means a metallic traction sheave, most often either a steel traction sheave or a cast iron traction sheave, which rope tension results from the aforementioned tension differences, is of a different magnitude on different points of the traction sheave. The hoisting ropes try to flex owing to this variable tension, in which case a small slip of the hoisting ropes is produced in the rope grooves of the traction sheave. In a normal run situation, including accelerations and brakings, when the hoisting rope arrives at the traction sheave it moves at the rim speed of the traction sheave and the slipping caused by the flexing of the hoisting rope occurs on only a part of the contact length between the hoisting rope and the traction sheave, and this part is in this case in the direction in which the hoisting rope leaves the traction sheave. The slipping in fact distributes the flexing of the hoisting rope resulting from the tension differences to a longer part of the contact length between the hoisting rope and the traction sheave, possibly even to the whole length of the curve on which the hoisting rope is in contact with the traction sheave. This slipping between the hoisting rope and the traction sheave resulting from the flexing occurs towards the larger rope tension. Put more simply, it can be said that the part of the contact length between the hoisting rope and the traction sheave in which this type of slipping, as a consequence of the flexing of the hoisting rope, does not occur is a sort of friction reserve, on which the safe traction of a traction sheave elevator is based. Thus normally minor slipping occurs therefore on the side of the larger tension, but on the side of the lower tension slipping does not necessarily occur. In this case the hoisting ropes in their entirety do not yet slip in the rope grooves, but instead they only slip on the side of greater tension and they slip more the greater the rope tension is. It could be said that slipping occurs on only a part of the contact length between the hoisting rope and the traction sheave or that slipping is partly present when the traction sheave moves the hoisting ropes in a normal run situation. In the invention partial slipping, mostly of the type described above, between the traction sheave and the hoisting rope is utilized by placing in the rope grooves a flexible insert material, the frictive traction of which improves when the hoisting rope slips in relation to it. Preferably the friction coefficient between this type of material and the rope is even at its minimum larger than the friction coefficient between the rope and the actual traction sheave material. Even more preferably the friction coefficient between this type of material and the rope is even at its minimum larger than the friction coefficient between the rope and the actual traction sheave material at its minimum. In itself the slipping between the rope and the traction sheave in normal loading situations of the elevator is very minor, because with normal hoisting rope dimensionings elongation of the ropes is less than one part in a thousand. When using the solution of the invention the normal situation is indeed that the hoisting ropes slip, owing to elongation, to some extent against the actual traction sheave material, but do not slip against the flexible insert material, but instead receive support force that is tangential with respect to the traction sheave from the deformation of the flexible insert material and/or from internal shearing stress. Also, in a situation in which the rope starts to slip against the insert material, the support force that is tangential with respect to the traction sheave is transmitted between the traction sheave and the hoisting rope via the deformation of the flexible insert material and/or via internal shearing stress. Thus improved traction between the hoisting rope and the rope groove is achieved for at least a part of the contact surface, which traction also improves the overall traction.

A very suitable insert material to be put into the rope grooves is flexible elastomer, which is comprised e.g. of rubber, polyurethane, cellular rubber, foamed plastic or suitably e.g. of microcellular polyurethane and in which compressions can be directed in only one direction, i.e. in the direction of the radius of the traction sheave. One insert material manufactured from microcellular polyurethane and suited for this purpose is e.g. Cellasto, the density of which is between approx. 300-650 kg/m$^3$, suitably, however, less than approx. 550 kg/m$^3$ and preferably between approx. 350-500 kg/m$^3$.

Correspondingly, it is advantageous to dimension the insert material for the rope groove such that the compression of the insert caused by the elevator rope does not produce too great a change in force. In this case the compression of the insert is e.g. between 15-40%, preferably between 18-25% and suitably approx. 20%. Correspondingly, in this case the magnitude of the compression absolutely is approx. 1-2 mm, depending on the dimensioning. Thus the metallic support surface of the rope groove bears the largest part of the rope forces and the insert is, on the basis of its dimensioning, compressed by the aforementioned 15-40%, bearing only the essentially constant-magnitude force produced by the compression in the direction of the radius of the traction sheave.

A structure in which the insert bears the hoisting rope with essentially constant support force is easily achieved, in which case the interaction between the hoisting rope and the insert does not depend on the loading of the elevator. In this case the groove material determining the position of the elevator rope in the radial direction, which groove material is harder than the insert, always bears all the variations of the load.

It is also possible to dispose the flexible insert material in the rope grooves of the traction sheave such that it is on the sides of the rope groove and correspondingly the inflexible, bearing, metal material is on the base of the rope groove.

The solution according to example embodiments additionally makes it possible to provide also a new elevator with a traction sheave of the type described above, the rope grooves of which comprise at least two different materials, of which the first material is essentially hard and inflexible material, such as metal or hard plastic, and the second material is essentially flexible material, which is arranged to increase its frictive traction when the slipping of an elevator rope increases at some point in the rope groove.

With the solution according to example embodiments many different advantages are achieved, depending on what it is desired to optimize in connection with modernization. One basic advantage is, among others, that the frictive traction of the traction sheave improves, as result of which the slip control of the elevator ropes on the traction sheave also improves. Owing to this, one advantage is also that, owing to the better frictive traction, smaller and lighter structures can be used in the elevator, which also results in a reduction of manufacturing costs. With the lighter solution according to example embodiments, the energy consumption is also smaller than with conventional solutions, in which case also the operating costs decrease owing to the smaller machine needed. Likewise the wearing of structures decreases because smaller forces act on the structures. Another advantage is that the frictive traction of the elevator ropes can be improved without increasing the stress of the elevator ropes. As a result of this, a considerable advantage is achieved in that the lifetime of the elevator ropes can be lengthened. In this case e.g. the aforementioned DW and ESW rope suspensions can be changed for an SW rope suspension that wears less ropes, in which case the shaft loads decrease and the lifetime of both the machine and roping increases. Additionally, with suitable optimization the number of ropes can be reduced.

As a result of the aforementioned advantages concerning improvement of frictive traction, also other decisive advantages are achieved. For example, elevator cars can be enlarged if there is space in the hoistway for this purpose. A further advantage is that the speed of the elevator can be increased, because the frictive traction rises. In this case, for example, the maximum speed range of the elevator can be lengthened and/or the acceleration of the elevator improved.

BRIEF DESCRIPTION OF DRAWINGS

In the following, the invention will be described in more detail by the aid of one example of its embodiment with reference to the attached drawings, wherein.

DETAILED DESCRIPTION OF EXAMPLE EMBODIMENTS

Figure 1:
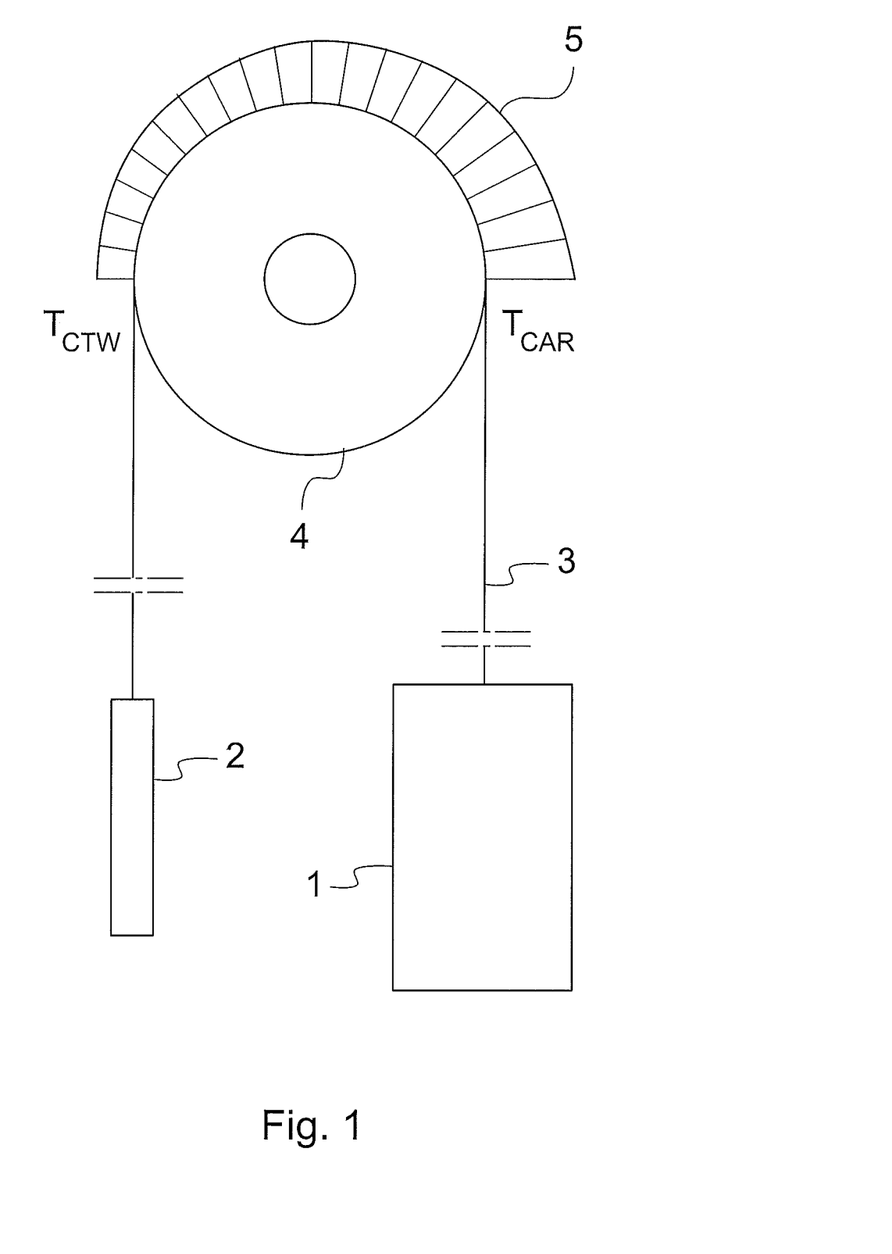
FIG. 1 presents a diagrammatic and simplified side view of one traction sheave elevator with its rope tension chart.
Figure 2:
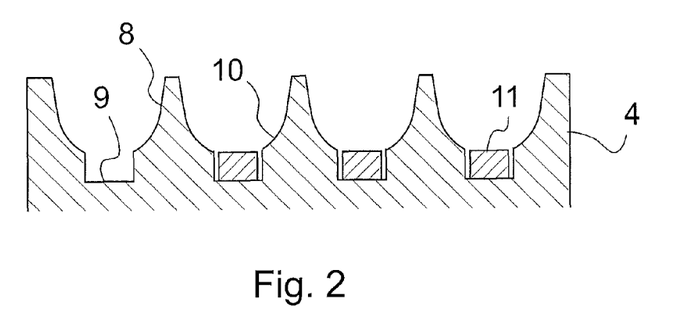
FIG. 2 presents a sectioned view of one top part of a traction sheave of a traction sheave elevator modernized with the method according to the invention, with its undercut rope grooves and with an insert in a part of the grooves.

FIG. 1 presents a diagrammatic and simplified view of one typical traction sheave elevator, which comprises an elevator car 1, a counterweight 2 and, fixed between these, elevator roping formed of elevator ropes 3 that are parallel to each other. The elevator ropes 3 are guided to pass over the traction sheave 4 rotated by the hoisting machine of the elevator in rope grooves dimensioned for the elevator ropes 3. As it rotates, the traction sheave 4 at the same time moves the elevator car 1 and the counterweight 2 in the up direction and down direction, due to friction.

Owing to the difference between the counterweight 2 and the elevator car 1 plus the load at any given time in the car, the rope forces $T_{CTW}$ and $T_{CAR}$ exerted on the elevator ropes 3 are of different magnitudes on different sides of the traction sheave 4. When the elevator car 1 contains less than one-half of the nominal load, the counterweight is generally heavier than the elevator car 1 with load. In this case the rope force $T_{CTW}$ between the counterweight 2 and the traction sheave 4 is greater than the rope force $T_{CAR}$ between the elevator car 1 and the traction sheave 4. Correspondingly, when the elevator car 1 contains over one-half of the nominal load, the counterweight 2 is generally lighter than the elevator car 1 with load. In this case the rope force $T_{CTW}$ between the counterweight 2 and the traction sheave 4 is smaller than the rope force $T_{CAR}$ between the elevator car 1 and the traction sheave 4. In the situation presented in FIG. 1, the rope force between the elevator car 1 and the traction sheave 4 is $T_{CAR} > T_{CTW}$. As a consequence, the rope tension acting on the elevator ropes 3 that is produced by the rope forces $T_{CTW}$ and $T_{CAR}$ in the rope grooves of the traction sheave 4 is not constant, but instead increases when progressing from the counterweight 2 side to the elevator car 1 side. This growing rope tension is diagrammatically presented by the tension chart 5 drawn in FIG. 1. As explained earlier, this tension difference tries to cause slipping of the elevator ropes 3 in the rope grooves. It is endeavored to compensate for the tension difference across the traction sheave 4 with a controlled slip.

FIGS. 2-5 present the top part of a sectioned traction sheave 4 of a traction sheave elevator modernized with the method according to the invention. The bottom part of the rope groove 8 is magnified in FIGS. 4 and 5. The traction sheave 4 is e.g. metallic in its material, suitably either of cast iron or of steel. The traction sheave 4 comprises parallel rope grooves 8 on the rim of the rope sheave that are of essentially semicircular cross-sectional shape in their bottom part, into the base of which grooves an undercut groove 9 has been made that is essentially rectangular in its cross-sectional shape and is essentially symmetrical with respect to the cross-section of the rope groove 8.

Figure 3:
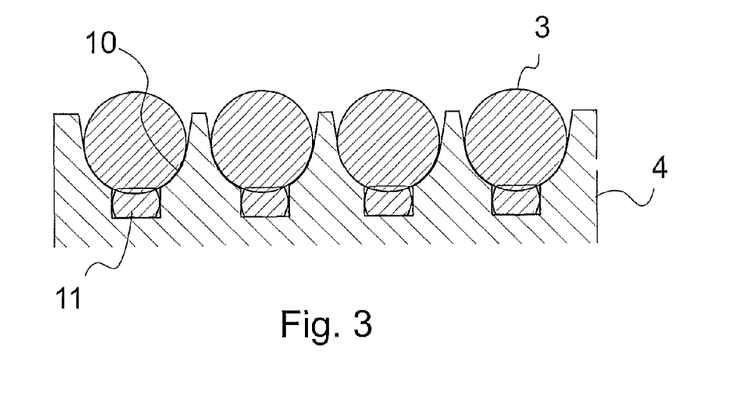
FIG. 3 presents a sectioned view of the top part of a traction sheave according to FIG. 2, with its undercut rope grooves with inserts and with elevator ropes in the rope grooves.
Figure 4:
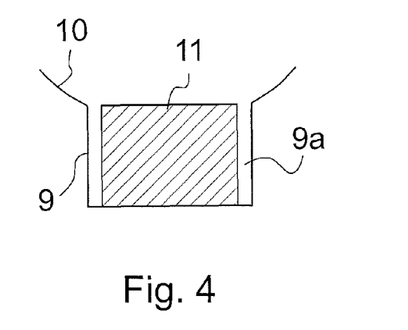
FIG. 4 presents a diagrammatic, simplified and magnified view of the base of a rope groove of a traction sheave according to FIG. 2, with an insert but without rope.
Figure 5:
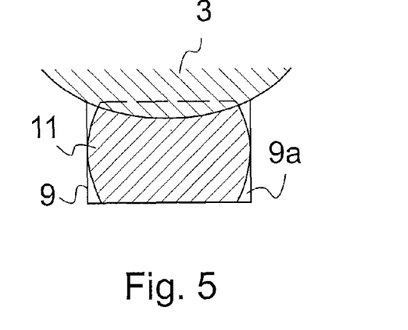
FIG. 5 presents a diagrammatic, simplified and magnified view of the base of a rope groove of a traction sheave according to FIG. 2, with an insert that the rope compresses.

A filler, i.e. an insert 11, of elastic material is disposed in each undercut groove 9 such that the top edge of the insert 11 is essentially higher than the lowest point of the radius of curvature of the semicircular rope groove 8. In other words, the insert 11 extends partly inside the essentially semicircular cross-sectional shape of the rope groove 8 and at the same time inside the space of passage of the elevator rope 3. For the sake of clarity the free top surface of the insert 11 in FIG. 3 is drawn with a dashed line to be visible inside the elevator rope 3. The insert 11 is fixed immovably into the undercut groove 9 of the rope groove 8. The fixing is implemented preferably e.g. by gluing the insert 11 at its base to the base of the groove 9. In addition, the insert 11 is shaped such that it is a ring of essentially one piece, which is flexible at least in the direction of the radius of the traction sheave 4. Preferably the insert 11 is more flexible in the radial direction than in the direction of the rim of the traction sheave 4, or at least the insert 11 is arranged so that flexing of the insert 11 under the elevator rope 3 is greater in the radial direction than in the rim direction. In addition, the insert 11 is preferably narrower than the undercut groove 9, in which case an air gap 9a remains between the insert 11 placed symmetrically in the groove 9 and the side edges of the groove 9, in the direction of which air gap the insert 11 can expand when the elevator rope 3 presses the insert 11 towards the base of the groove 9. The expansion is presented more clearly in FIG. 5. Although the insert 11 is preferably narrower than the undercut groove 9, an insert that in the cross-section of the rope groove completely fills the undercut groove in the lateral direction can also be applied in the invention. This type of completely filling insert can also be fixed, e.g. by gluing, to the sides of the undercut groove.

On both sides of the insert 11, essentially from the insert 11 towards the outer rim of the traction sheave 4, is a curved metallic support surface 10 in the rope groove 8, against which support surface the elevator rope 3 is fitted to be mainly supported. The rope groove 8, the undercut 9 and the height of the insert 11 are interdimensioned in relation to the diameter of the elevator rope 3 such that the elevator rope 3 compacts the insert 11 suitably in the direction of the radius of the traction sheave 4, but only so little that the metallic support surfaces 10 of the rope groove 8 bear the elevator rope 3 in all loading situations for the whole contact distance of the angle of traction, i.e. for the whole length of rope contact, and determine its position in the groove. In this case the equation below applies to the normal force $N_2$ exerted on the insert 11 and caused by the elevator rope 3:

$$N_2 < T/R, \text{ where}$$

T=the smaller rope force acting over the traction sheave, i.e. depending on the loading either $T_{CTW}$ or $T_{CAR}$ whichever is smaller at that time, and
R=the radius of the traction sheave.

In practice $N_2$ is as close as possible to the value T/R, e.g. between approx. 80-100% of the value T/R, preferably between approx. 90-100% of the value T/R.

If the tolerances are made to be stringent and the dimensioning is taken to its extreme, in practical applications, e.g. when making the car and the counterweight to be lighter than conventionally dimensioned in connection with modernization, it can happen that when applying the inventive concept the metallic support surfaces 10 do not necessarily bear the elevator ropes 3 in all situations for the whole distance of the angle of contact. In this case e.g. the elevator rope 3 can be momentarily detached from the support surfaces 10 for a small contact distance, in which case the angle of contact borne by the metallic support surfaces 10 is, in fact, smaller than the whole angle of contact. The solution according to the invention even in this case, however, works in principle, even if not as well as intended.

In this description, the term friction coefficient refers to the friction coefficient between the rope and the rope groove of the traction sheave, which friction coefficient is a consequence of different friction forces between the rope and the materials of the rope groove. The friction coefficient here is thus the empirically obtained friction coefficient between two objects that slide against each other, and not the specific friction coefficient for an individual material. Hereinafter this is also referred to as effective friction coefficient.

The material and structure of the insert 11 are selected to be such that the friction coefficient between the insert 11 and the contact surface of the elevator rope 3 is greater than the friction coefficient between the metallic support surfaces 10 of the rope groove 8 and the elevator rope 3. In addition, the material of the insert 11 is selected to be such that the friction coefficient between the insert 11 and the contact surface of the elevator rope 3 increases essentially when the sliding speed, i.e. the slip, between the surfaces increases. The friction mechanism of the insert 11 is in this case different to the friction mechanism of metal/metallic surface. Friction is achieved in this case mainly via the deformation and internal damping of the insert 11. As a result of the aforementioned dimensioning of the rope groove 8 and the selection of the material of the insert 11, the insert 11 participates even more in forming frictive traction when the slipping of the elevator ropes 3 increases at the same time as the frictive traction of the metallic support surface 10 of the rope groove 8 either remains the same or even decreases. These types of possible situations are e.g. accelerations, brakings and emergency stops. The friction of an elevator rope 3 against an insert 11 can be characterized as the combined effect of hysteresis friction and the adhesion effect of friction.

The elastic insert 11 is an elastomer, which is made e.g. of rubber, polyurethane, cellular rubber or suitably e.g. of microcellular polyurethane, in which the size of the bubbles is preferably e.g. in the region of 0.05-0.5 mm and the density of which material is between approx. 300-650 $kg/m^3$, suitably, however, less than approx. 550 $kg/m^3$ and preferably between approx. 350-500 $kg/m^3$. One such insert material manufactured from microcellular polyurethane suited for this purpose is e.g. a material available under the product name Cellasto.

On the basis of the dimensioning, the height of the insert 11 is selected such that the compression of the insert 11 caused by the elevator rope 3 is e.g. between 15-40%, preferably between 18-25% and suitably approx. 20%. In this case the magnitude of the compression absolutely is approx. 1-2 mm, depending on the dimensioning. Thus the metallic support surface 10 of the rope groove 8 bears the largest part of the rope forces and the insert 11 is, owing to its dimensioning, compressed by the aforementioned 15-40%, bearing only the essentially constant-magnitude force $N_2$ produced by the compression. Since the flexible insert 11 bears a part of the rope forces it at the same time reduces to some extent the pressure produced by the elevator rope 3 on the metallic support surfaces 10 of the rope groove 8, but however so little that the lifting force produced by the insert 11 is not sufficient to detach the elevator rope 3 from the support surfaces 10 of the rope groove 8.

Figure 6:
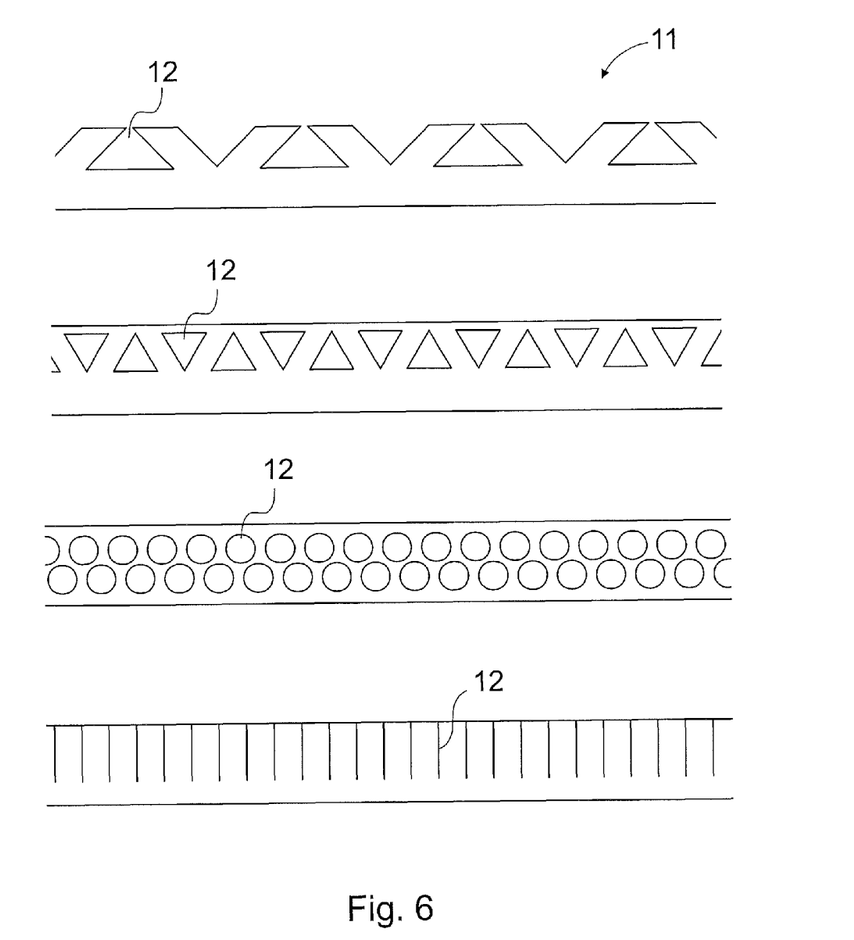
FIG. 6 presents a side view of different inserts of a groove of a traction sheave to be used in the method according to the invention, said inserts being provided with various relief cuts.

FIG. 6 presents a diagrammatic and simplified side view of different inserts 11 of a groove 9 of a traction sheave 4 to be used in the method according to the invention, said inserts being provided with various relief cuts 12, which help the insert 11 to flex in the longitudinal direction of the insert and which balance the deformation force produced in the insert by the rope 3.

With the method according to the invention two mechanisms transferring force to the elevator ropes 3 act in parallel in the rope grooves 8 of the traction sheave 4 of a modernized traction sheave elevator, of which mechanisms the first is rope/iron contact in the rope groove 8 and the second is rope/insert contact in the undercut 9 of the rope groove 8. There are various force effects that provide traction in a rope/insert contact, which are inter alia:

1) the compression force caused by the insert 11 exerted on the rope 3 in the radial direction of the traction sheave 4, which compression force can be adjusted to that desired by adjusting the compression and the properties of the insert 11, 2) the friction force between the insert 11 and the rope 3, and 3) the deformation force caused in the insert 11 by the transition of a non-slipping rope 3

4) and the deformation force caused in the insert by a slipping rope 3.

These phenomena can be examined in difference ways. For example, when a rope slips at least a part of the forces can be analyzed by means of the concepts of hysteretic friction. Since forces in the direction of the rope groove, i.e. in the tangential direction of the traction sheave, are produced in the insert material via friction, it can be thought that the insert material contains a support force between the hoisting rope and the metallic structure of the traction sheave, which support force is transmitted in the insert material as a shearing force, which stretches the insert material internally in the direction of the larger rope tension.

Maximal frictive traction is obtained in a situation in which the friction limit is close for the whole contact length, and in which the rope 3 does not slip with respect to the insert 11, and in which the deformation force would be constant. Since, however, the shifting of the rope 3 with respect to the insert 11 increases during the whole period of rope contact, the aforementioned maximal frictive traction will not be reached with a homogeneous structure of the insert 11, but instead the deformation force increases during the contact to be so large that slipping occurs. The deformation force can, however, be influenced with the properties and geometry of the insert 11. The most easily adjustable aspect is the thickness and compression of the insert 11. The next most easily adjustable aspect is the shaping of the surface of the insert 11.

FIG. 6 presents some inserts 11, in which various relief cuts 12, such as apertures, holes or lateral incisions, have been made in the surface or immediately below the surface. The relief cuts have been made e.g. by water jet cutting. The uppermost insert of FIG. 6 comprises triangular-shaped apertures 12 that are open at the top as viewed from the side and are consecutive to each other, every other of which apertures is tip downwards and every other is tip upwards. The next to uppermost insert 11 comprises an unbroken top surface, but immediately below the surface is a plurality of consecutive triangular apertures 12, every other of which apertures is tip downwards and every other is tip upwards. Correspondingly, in the next to lowermost insert 11 the top surface is also unbroken and as apertures 12 below the surface is a plurality of round holes in two rows, one on top of the other. The lowermost insert 11 comprises as apertures 12 a plurality of consecutive incisions in the lateral direction of the insert, which incisions form a comb-like structure, which enables better flexibility of the surface of the insert 11 by collapsing easily in the direction of the rope force when the rope force compresses the insert.

Figure 7:
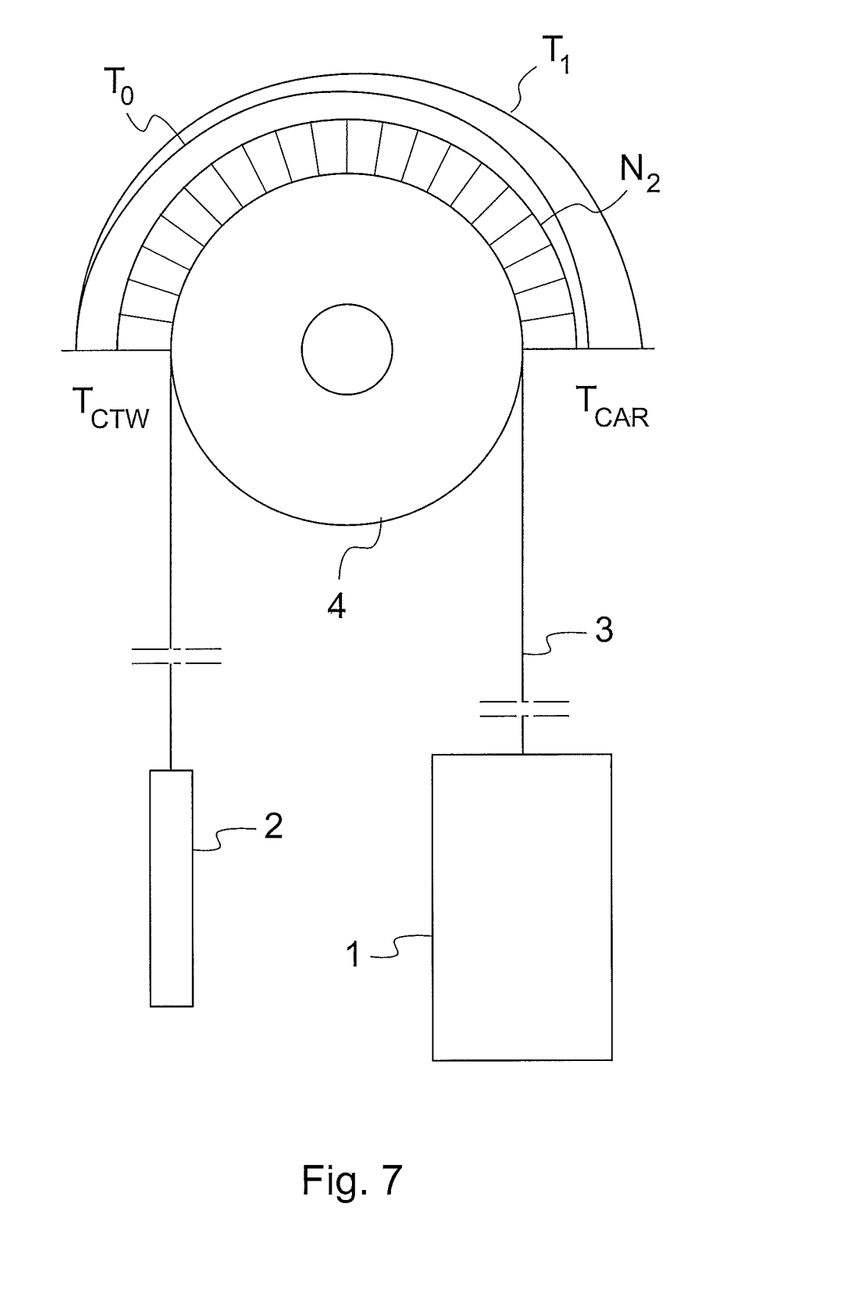
FIG. 7 presents a diagrammatic and simplified view of the different loading situations prevailing on the traction sheave, as viewed from the side of the traction sheave.

FIG. 7 presents diagrammatically and in simplified form the different loading situations prevailing on the traction sheave 4 of a traction sheave elevator modernized with the method according to the invention. The essentially constant-magnitude force $N_2$ produced by compression of the insert 11 is independent of the loading situation and therefore of essentially constant magnitude for the whole contact distance of the angle of traction. In the lightest loading situation, i.e. in a situation in which the elevator car 1 is empty, the rope force $T_0$ acting on the traction sheave 4 on the elevator car 1 side is smaller than on the counterweight 2 side. In this case, therefore, $T_{CAR} < T_{CTW}$ and the rope force $T_0$ increases essentially evenly over the whole distance of the traction surface when progressing from the elevator car 1 side to the counterweight 2 side.

Additionally, it is seen from FIG. 7 that also in this lightest loading situation the rope force $T_0$ is greater for the whole contact distance of the angle of traction than the lifting force $N_2$ produced from the compression of the insert 11, so that the lifting force $N_2$ is not able to detach the elevator rope from the metallic support surfaces 10. In this case the elevator rope 3 has the support of the hard, inflexible metallic support surface 10 over the whole angle of contact.

Correspondingly, in the heaviest loading situation, i.e. in a situation in which the elevator car 1 is full, the rope force $T_1$ acting on the traction sheave 4 on the elevator car 1 side is greater than on the counterweight 2 side. In this case $T_{CAR} > T_{CTW}$ and the rope force $T_1$ increases essentially evenly over the whole contact distance of the angle of traction when progressing from the counterweight 2 side to the elevator car 1 side.

Figure 8:
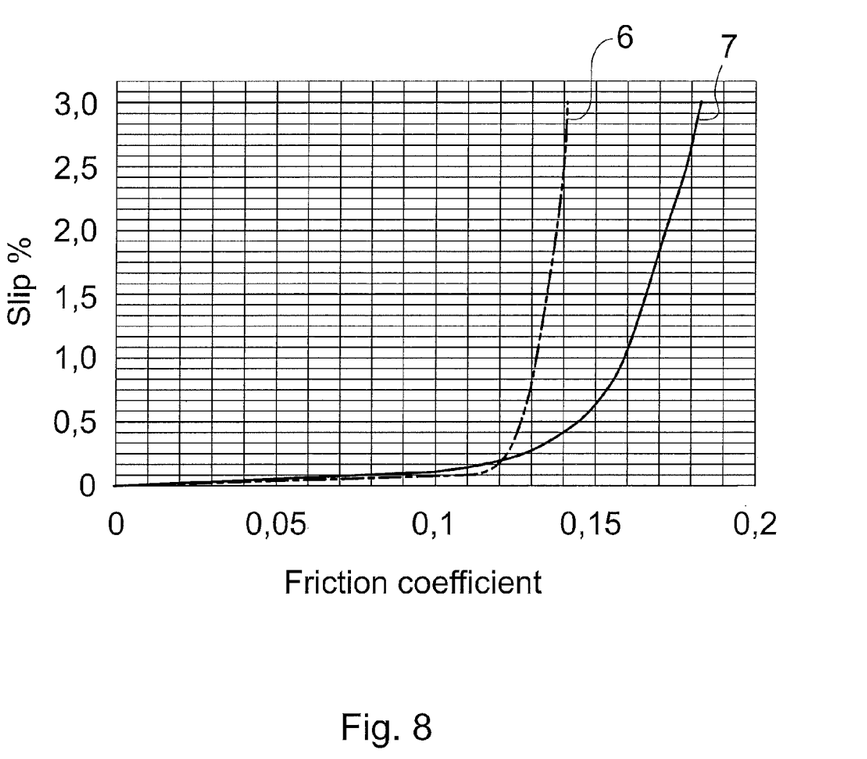
FIG. 8 presents a graph, compiled on the basis of measurement results, of the ratio of the slip percentage of an elevator rope and also of the friction coefficient between the elevator rope and the rope groove.

FIG. 8 presents a graph, compiled on the basis of the measurement results made in a laboratory, of the ratio of the slip percentage (Slip %) of an elevator rope 3 and of the friction coefficient (Friction coefficient) between the elevator rope 3 and the rope groove. The case shown here is thus the empirically obtained effective friction coefficient between two objects that slide against each other, and not the specific friction coefficient for an individual material.

It is seen from the graph that in the case of a rope groove that is just of metal, e.g. of cast iron, which rope groove is represented by the curve 6 in FIG. 8, the effective friction coefficient rises linearly and relatively sharply in the initial phase of slip. When the slip is approx. 0.1%, the rise in the effective friction coefficient, however, rapidly slows down and does not increase over the limit of approx. 0.14 here, even if the slip were to increase more. The curve 6 thus turns into an essentially vertical position as the slip increases further. In this case, the situation is that the traction of the elevator rope in the groove of the traction sheave is lost. It is typical for a metallic rope groove that when traction is lost, it is lost abruptly, and there is not really any adjustment margin in relation to traction.

Correspondingly, in the case of a metallic, e.g. cast iron, rope groove filled with an elastic insert 11 according to the invention, which rope groove is represented by the curve 7 in FIG. 8, the effective friction coefficient again rises linearly and relatively sharply in the initial phase of slip. As the slipping increases, the effective friction coefficient now continues its increase, and the curve 7 does not turn into a vertical position at all. At small values of slip the frictive traction produced by the insert 11 is essentially small and the frictive traction of the metal contact prevails, but when the slipping speed increases, the frictive traction of the insert 11 starts to increase and at the same time the frictive traction of the metal contact decreases proportionately. For example, on the basis of test results it can be estimated that with the dimensioning and materials used when the slip is 1%, the effective friction coefficient between the insert 11 and the elevator rope 3 is approx. 0.4 or more. Nevertheless, the effective overall friction coefficient is according to curve 7 only approx. 0.16. When the slipping increases, therefore, the effective friction coefficient between the insert 11 and the elevator rope 3 is greater than the effective friction coefficient between the metallic support surfaces 10 of the rope groove 8 and the elevator rope 3.

In practice, when just a metallic, e.g. cast iron, rope groove is involved, values of the effective friction coefficient that are greater than 0.1 cannot be used in the dimensioning, so that sufficient traction reserve would remain on the traction sheave for unexpected situations. Instead of that; in the solution according to the invention there is ample traction reserve, because the curve 7 starts to climb gently. In this case larger values than 0.1, e.g. values up to 0.14, can be used for the effective friction coefficient in the dimensioning. This enables a higher ratio $T_{CAR}/T_{CTW}$ of rope forces, in which case smaller masses can be moved, a further consequence of which is smaller acceleration forces, lower energy consumption and smaller losses as well as, with regard to the ropes, rope suspensions containing a lot of bendings that stress the ropes are replaced with simpler suspensions that lengthen the lifetime of the elevator ropes. Likewise, because narrower undercut grooves can be used the lifetime of the ropes is extended. In addition, savings can be made in materials.

On the basis of test results, it can be stated that in certain conditions the total traction increases when the rope force decreases. This is largely due to the fact that the friction force of the insert 11 at constant slip speed is essentially constant, because the normal force acting on the insert 11 is not dependent on the rope force so long as the metallic support surfaces 10 of the rope groove 8 bear the elevator ropes 3 and determine their position in the rope grooves 8. In this case it is valid to say that the smaller the rope force is, the larger the relative proportion of the friction force of the insert 11 is. This is very important from the perspective of the invention because frictive traction problems generally occur particularly with small rope forces.

Figure 9:
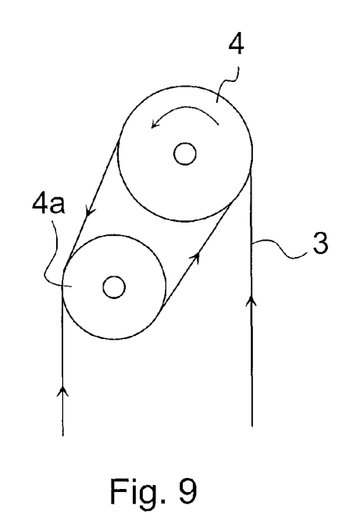
FIG. 9 presents a diagrammatic and simplified side view of one double-wrap (DW) elevator suspension.

FIG. 9 presents a diagrammatic and simplified side view of one double-wrap (DW) elevator suspension, in which parallel elevator ropes 3, e.g. coming from the elevator car, rise up first to the traction sheave 4, pass around the top of the traction sheave 4 and descend down to the diverting pulley 4a, pass around the bottom of it and rise up again to the traction sheave 4 and after passing around the top of the traction sheave 4 for the second time the elevator ropes descend to the counterweight. In this solution the angle of contact of the elevator ropes 3 on the traction sheave is extremely large, in the solution according to the figure almost 360 degrees, but it can also be larger. In this case the frictive traction is large, but one problem is the many bendings of the elevator ropes 3, which stress the ropes and thus shorten the lifetime of the ropes.

Figure 10:
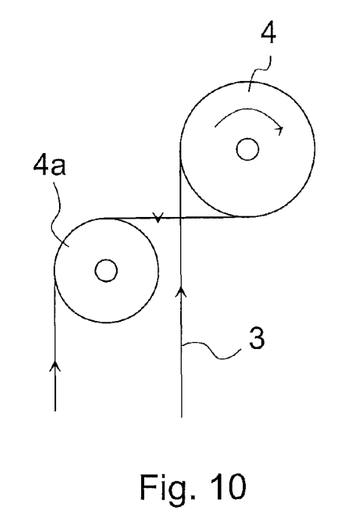
FIG. 10 presents a diagrammatic and simplified side view of one extended single-wrap (ESW) elevator suspension.

FIG. 10 presents a diagrammatic and simplified side view of one extended single-wrap (ESW) elevator suspension, in which parallel elevator ropes 3, e.g. coming from the elevator car, rise up first between the diverting pulley 4a and the traction sheave 4 to the traction sheave 4, pass around the top of the traction sheave 4 and descend down to the diverting pulley 4a, passing around the top of it and descending onwards to the counterweight. In this solution the angle of contact of the elevator ropes 3 on the traction sheave 4 is at most approx. 270 degrees. In this case also the frictive traction is large, but a problem is still the many bendings of the elevator ropes 3, which stress the ropes and thus shorten the lifetime of the ropes, although not as much as in DW solutions. ESW, as also DW, results in a very wide traction sheave and also in inclined pulling on the traction sheave.

Figure 11:
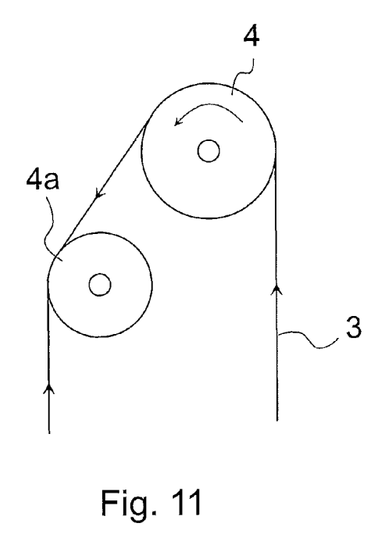
FIG. 11 presents a diagrammatic and simplified side view of one single-wrap (SW) elevator suspension.

FIG. 11 presents a diagrammatic and simplified side view of one other single-wrap (SW) elevator suspension, in which parallel elevator ropes 3, e.g. coming from the elevator car, rise up first to the traction sheave 4, pass around the top of the traction sheave 4 and descend to the counterweight via the diverting pulley 4a. In this solution the angle of contact of the elevator ropes 3 on the traction sheave is smaller than 180 degrees and there are two bendings, in which case the stresses directed on the ropes are smaller, but also the frictive traction is much smaller than in DW and ESW solutions.

Figure 12:
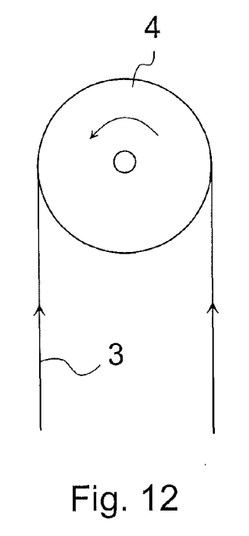
FIG. 12 presents a diagrammatic and simplified side view of one other single-wrap (SW) elevator suspension.

FIG. 12 presents a diagrammatic and simplified side view of one single-wrap (SW) elevator suspension, in which parallel elevator ropes 3, e.g. coming from the elevator car, rise up to the traction sheave 4, pass around the top of the traction sheave 4 and descend to the counterweight. In this solution the angle of contact of the elevator ropes 3 on the traction sheave is 180 degrees and there is only one bending, in which case the stresses directed on the ropes are smaller, but also the frictive traction is much smaller than in DW and ESW solutions.

In the method according to the invention an existing traction sheave elevator is modernized such that in connection with the modernization a traction sheave 4 is replaced into the elevator, in which traction sheave the frictive traction of the rope grooves 8 is improved e.g. such that the larger part of the rope forces exerted on the rope groove 8 is borne with the metallic support surfaces 10 of the rope groove 8 of an essentially hard and inflexible first material, and correspondingly the smaller part of the rope forces exerted on the rope groove 8 is borne with a flexible second material that is the insert 11. Furthermore, when the slipping of an elevator rope 3 increases in a rope groove 8, the frictive traction of the elevator rope 3 is increased with the flexible second material that is the insert 11. This means that at the same time as the slipping of the elevator rope 3 increases in the rope groove 8 the frictive traction of the elevator rope 3 is transferred in relation to the increase of slipping from the hard and inflexible first material, i.e. from the metallic support surfaces 10 of the rope groove 8, to the flexible second material that is the insert 11.

Preferably in the method according to the invention an insert 11 that is disposed in the undercut 9 of the rope groove 8 of the rope sheave 4 and that extends in its height into the space of passage of the elevator rope 3 is used as the flexible second material, which insert is compressed with the elevator rope 3 in the direction of the radius of the traction sheave 4 approx. 15-40%, preferably approx. 18-25% and suitably approx. 20% of its height, and at the same time by means of the insert 11 a force $N_2$ of essentially constant magnitude is produced that lightens the pressure exerted by the elevator rope 3 in the rope groove 8.

In connection with modernization, one or more of the following structures or properties are simultaneously changed:
  a double-wrap (DW) machine is exchanged for a single-wrap (SW) machine
  an extended single-wrap (ESW) machine is exchanged for a single-wrap (SW) machine
  the existing undercut of the rope grooves is made smaller
  the number of elevator ropes is reduced
  the machine and other elevator structures are made lighter
  the elevator car is enlarged
  the speed of the elevator is increased by extending the period of maximum speed
  the speed of the elevator is increased by improving the acceleration of the elevator It is obvious to the person skilled in the art that different embodiments of the invention are not only limited to the examples described above, but that they may be varied within the scope of the claims presented below. Thus, for example, the shape and positioning of the inserts in a rope groove can also be different than what is described above. Instead of an integral ring, the insert can be e.g. a tape, which is glued to the base of the undercut groove.

The invention claimed is:
1. A traction sheave elevator, comprising:
   an elevator car; and a traction sheave that moves the elevator car via elevator ropes, the traction sheave includes one or more rope grooves corresponding to a number of elevator ropes, each rope groove includes at least two different materials in contact with the corresponding elevator rope, of which a first material is a hard and inflexible material, and a second material is a flexible material, wherein the second material is fitted into the rope groove of the traction sheave and supports the elevator rope, whereby a radial force exerted on the second material by the elevator rope is smaller than a resulting radial force exerted on the elevator rope by the second material, and wherein the second material is narrower in width than the rope groove, whereby air gaps between sidewalls of the second material and sidewalls of the rope groove are formed when the second material is fitted symmetrically in the rope groove, which air gaps accommodate an expansion of the second material when the elevator rope presses the second material towards a base of the rope groove.

2. The traction sheave elevator according to claim 1, wherein each of the one or more rope grooves of the traction sheave includes an undercut, which contains the second material as an insert, and in that the rope groove, the undercut and a height of the insert are inter-dimensioned in relation to a diameter of the elevator rope such that the elevator rope compresses the insert in a direction of radius of the traction sheave a distance whereby a support surface of the rope groove bears the elevator rope along an entirety of contact in the one or more rope grooves, which entirety of contact defines an angle of traction of the elevator rope about the traction sheave.

3. The traction sheave elevator according to claim 2, wherein the height of the insert is selected such that the insert is between approximately 15-40%, caused by the elevator rope.

4. The traction sheave elevator according to claim 3, wherein the height of the insert is selected such that the insert is between approximately 18-25%, caused by the elevator rope.

5. The traction sheave elevator according to claim 4, wherein the height of the insert is selected such that the insert is approximately 20%, caused by the elevator rope.

6. The traction sheave elevator according to claim 2, wherein the height of the insert and the dimensioning of the undercut groove are selected such that the compression of the insert caused by the elevator rope is between approximately 1-2 mm.

7. The traction sheave elevator according to claim 2, wherein on a surface of the insert or immediately below the surface is a plurality of consecutive relief cuts in a longitudinal direction of the insert, which are fitted to balance a deformation force produced in the insert by the elevator rope.

8. The traction sheave elevator according to claim 2, wherein a stress of the elevator rope is reduced by reducing a width of the undercut groove.

9. The traction sheave elevator according to claim 2, wherein a stress of the elevator rope is reduced by reducing an angle of contact between the elevator ropes and the traction sheave.

10. The traction sheave elevator according to claim 2, wherein the insert is fixed immovably into the undercut of each of the one or more rope grooves.

11. The traction sheave elevator according to claim 1, wherein the second material is a microcellular polyurethane.

12. The traction sheave elevator according to claim 11, wherein the microcellular polyurethane has a size of bubbles in a region of 0.05-0.5 mm and a density of between approximately 300-600 kg/m$^3$.

13. The traction sheave elevator according to claim 1, wherein the second material is configured to provide an increase in friction traction when the second material is deformed in a direction of shear.

14. The traction sheave elevator according to claim 1, wherein the first material is at least one of a metal and a hard plastic.

15. The traction sheave elevator according to claim 1, wherein the second material is made from at least one of a rubber, a polyurethane, and a cellular rubber.

* * * * *